US009132957B1

(12) United States Patent
 Girdhar et al.

(10) Patent No.: US 9,132,957 B1
(45) Date of Patent: Sep. 15, 2015

(54) PROCESSING OF MISPLACED ITEMS TO RESOLVE INVENTORY DEFECTS

(71) Applicant: Amazon Technologies, Inc., Reno, NV (US)

(72) Inventors: Sachin Girdhar, Delhi (IN); Manish Agarwal, Haryana (IN); Lakhan Arya Multani, Agra (IN)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/299,984

(22) Filed: Jun. 9, 2014

(51) Int. Cl.
 *G06F 7/00* (2006.01)
 *B65G 1/00* (2006.01)

(52) U.S. Cl.
 CPC ........................................ *B65G 1/00* (2013.01)

(58) Field of Classification Search
 None
 See application file for complete search history.

(56) References Cited

U.S. PATENT DOCUMENTS

2011/0166694 A1* 7/2011 Griffits et al. ................ 700/215
2011/0279666 A1* 11/2011 Strombom et al. ............ 348/78
2013/0138539 A1* 5/2013 Delaney et al. ............... 705/28

* cited by examiner

*Primary Examiner* — Yolanda Cumbess
(74) *Attorney, Agent, or Firm* — Lowenstein Sandler LLP (57) ABSTRACT

A misplaced item service identifies a plurality of inventory storage locations in a materials handling facility associated with a misplaced item. The misplaced item service determines an ordered list of the plurality of inventory storage locations, wherein the inventory storage locations are arranged in the ordered list based at least in part on a location density of the inventory storage locations, a population density of the inventory storage locations and a last inventory storage location inspected.

20 Claims, 8 Drawing Sheets

PROCESSING OF MISPLACED ITEMS TO RESOLVE INVENTORY DEFECTS

BACKGROUND

Modern inventory systems, such as those in materials handling facilities, distribution warehouses, mail-order warehouses, and custom-order manufacturing facilities, maintain a virtual inventory of items that are supposed to be housed at the facility. The virtual inventory may specify what items are supposed to be present, as well as a specific location within the facility where each item is supposed to be housed. In order to maintain accuracy, the virtual inventory should match a physical inventory of what items are actually housed at the facility, as well as the locations within the facility of where those items are actually housed.

BRIEF DESCRIPTION OF THE DRAWINGS

Embodiments of the present invention will be understood more fully from the detailed description given below and from the accompanying drawings, which, however, should not be taken to limit the present invention to the specific embodiments, but are for explanation and understanding only.

DETAILED DESCRIPTION

Materials handling facilities such as warehouses often struggle to keep track of inventory accurately. A significant contributor to this struggle is the need to process misplaced items. The materials handling facility may maintain a virtual inventory of the inventory storage locations for each item or type of items. Generally, this virtual inventory can be relied on to accurately reflect the physical inventory and allow materials handling facility associates to locate particular items within the facility. In certain situations, however, an inventory item may be misplaced, thereby rendering the virtual inventory inaccurate. For example, if an item falls off a shelf, is dropped during transport, or is otherwise misplaced, the proper storage bin in the materials handling facility may not be readily apparent.

In one embodiment, a misplaced item service may be executed to generate an ordered list of potential item storage bins for a misplaced item which can be inspected by a materials handling facility associate to determine if the potential item storage bins are the actual bins to which the misplaced item can be returned. The potential item storage bins may be arranged in the ordered list in such a way so as to improve the probability of finding the correct storage bin for the misplaced item and to optimize a transit time between the potential items storage bins for the materials handling facility associate in order to improve the efficiency with which the proper item storage bin is determined.

In one embodiment, the misplaced item service receives an indication of a location of a misplaced item bin within a materials handling facility. The materials handling facility may include a plurality of bins including the misplaced item bin and a plurality of item storage bins. The misplaced item service may receive an indication of a misplaced item that was inadvertently removed from one of the plurality of item storage bins and placed in the misplaced item bin. The misplaced item service may identify a group of potential item storage bins that are each located within a threshold distance of the location of the misplaced item bin. In one embodiment, a virtual inventory of the materials handling facility indicates that each potential item storage bin in the group comprises one or more items having a same item type as the misplaced item. From the group of potential bins, the misplaced item bin determines an ordered list of potential item storage bins from the group of potential bins, where the potential item storage bins on the ordered list are arranged in an order to optimize a transit time between the potential item storage bins in the materials handling facility for a materials handling facility associate. The misplaced item service provides the ordered list to a client device corresponding to the materials handling facility associate, so that the associate can inspect the relevant bins to determine where the misplaced item belongs.

Figure 1:
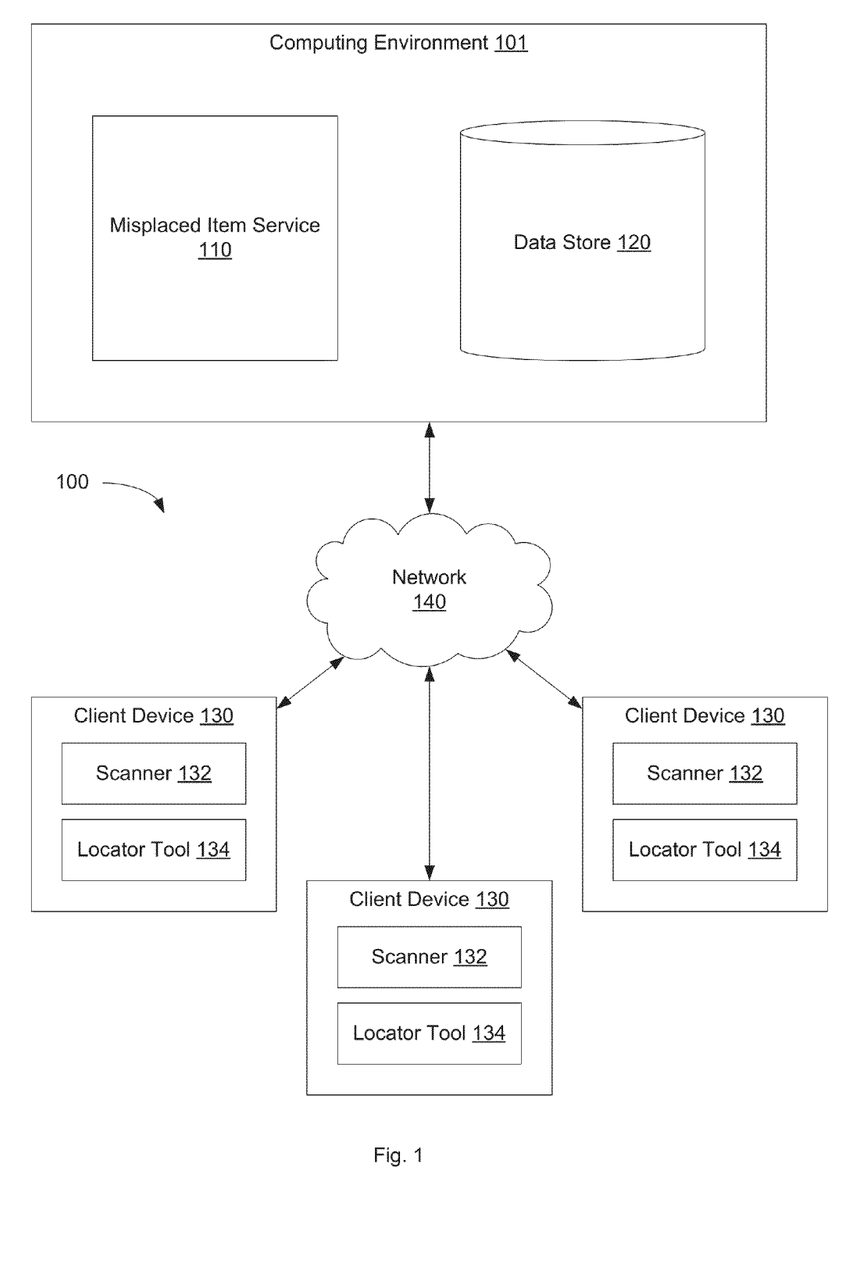
FIG. 1 is a block diagram illustrating a networked environment in which embodiments of the present invention may be implemented.

FIG. 1 is a block diagram illustrating a networked environment for processing misplaced items to resolve physical inventory, according to an embodiment. The networked environment 100 includes a computing environment 101 and one or more client devices 130, which are in data communication with each other via a network 140. The network 140 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 101 may include, for example, a server computer or any other system providing computing capability. Alternatively, the computing environment 101 may employ a plurality of computing devices that may be arranged, for example, in one or more server banks or computer banks or other arrangements. Such computing devices may be located in a single installation or may be distributed among many different geographical locations. For example, the computing environment 101 may include a plurality of computing devices that together may comprise a hosted computing resource, a grid computing resource and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various implementations. Also, various data may be stored in a data store 120 that is accessible to the computing environment 101. The data store 120 may be representative of a plurality of data stores, as can be appreciated. The data stored in the data store 120, for example, is associated with the operation of the various applications and/or functional entities described below.

The components executed on the computing environment 101, for example, can include a misplaced item service 110, and other applications, services, processes, systems, engines, or functionality not discussed in detail herein. The misplaced item service 110 may be executed to generate an ordered list of potential item storage bins for a misplaced item which can be inspected by a materials handling facility associate to determine if the potential item storage bins are the actual bins to which the misplaced item can be returned. The potential item storage bins may be arranged in the ordered list in such a way so as to optimize a transit time between the potential items storage bins for the materials handling facility associate in order to improve the efficiency with which the proper item storage bin is determined. In one embodiment, the transit time may be the time that it takes a person to walk between potential item storage bins. In other embodiments, the transit time may represent any amount of time that it takes a person, robot or other device to travel in any variety of ways between the locations of the potential item storage bins. Additional details of misplaced item service 110 are provided below.

Client devices 130 are representative of a plurality of client devices that may be coupled to the network 140. The client devices 130 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with similar capability. In one embodiment, the client devices 130 may each include a scanner 132 and a locator tool 134. Scanner 132 may be a barcode scanner, quick response (QR) code scanner, radio frequency identification (RFID) chip reader, charge-coupled device (CCD) reader, camera or some other type of scanner that can be used to identify a specific bin or inventory storage location in the materials handling facility. For example, each bin in the materials handling facility may be identified using a barcode, RFID chip or other machine-readable representation of data. Scanner 132 may be used to read the barcode and convey the identity of the scanned bin to locator tool 134 on client device 130.

The client devices 130 may be configured to execute various applications such as locator tool 134 and/or other applications. The locator tool 134 may be an application or other program that is executed on a client device 130, for example, to access network content served up by the computing environment 101 and/or other servers. To this end, the locator tool 134 may include, for example, a browser, a dedicated application, etc. The client devices 130 may be configured to execute applications beyond the locator tool 134 such as, for example, email applications, social networking applications, word processors, spreadsheets, or other applications. The locator tool 134 may provide a user interface on a display of the client device 130. The display may include, for example, one or more devices such as liquid crystal displays (LCDs), gas plasma-based flat panel displays, organic light emitting diode (OLED) displays, electrophoretic ink (E ink) displays, LCD projectors, or other types of display devices, etc. In one embodiment, locator tool 134 provides the identity of the scanned bin to misplaced item service 110. In response, locator tool 134 may receive an indication of one or more potential item storage bins to be inspected for determination of whether they correspond to the misplaced item. Additional details of locator tool 134 are provided below.

Figure 2:
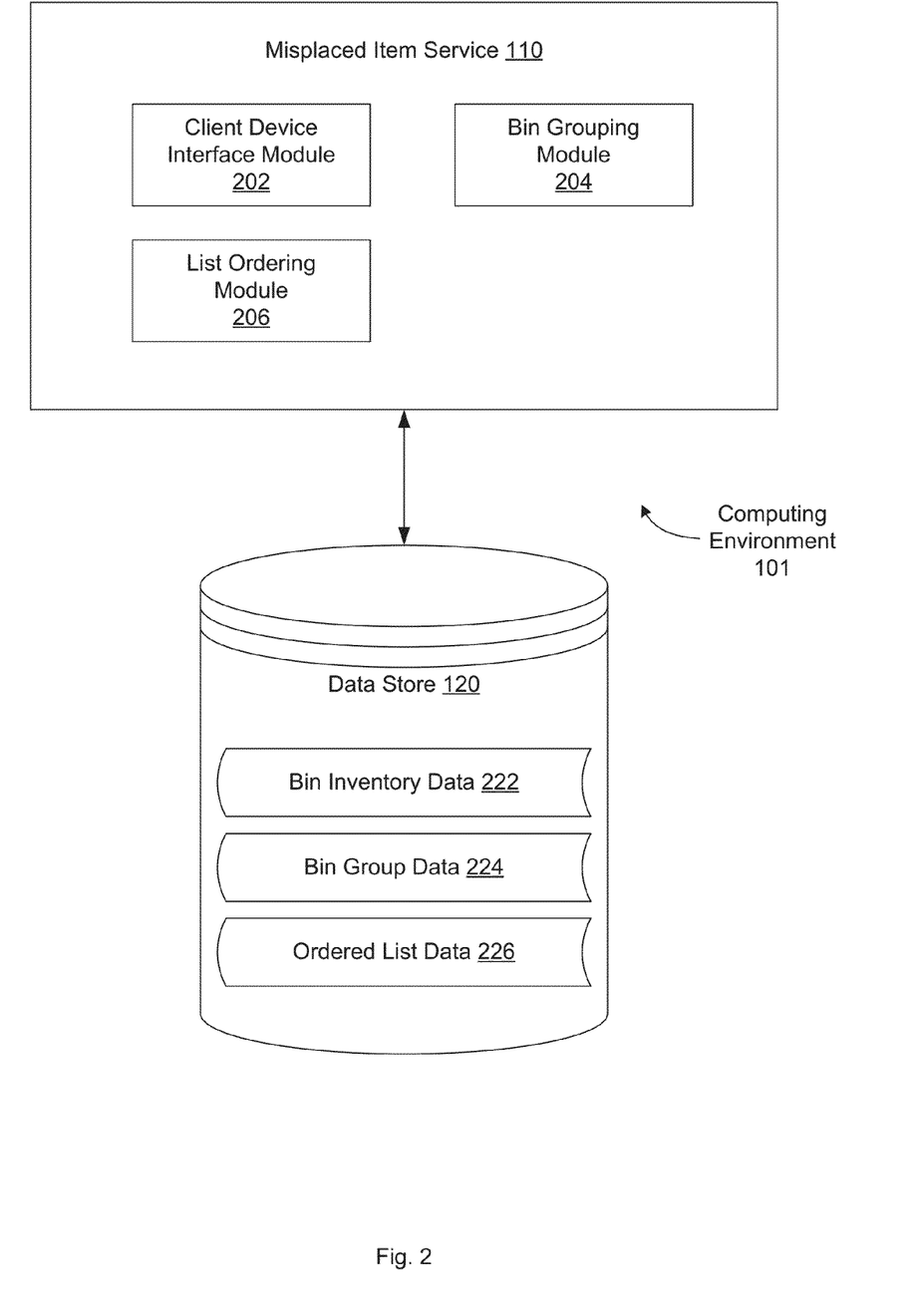
FIG. 2 is a block diagram illustrating a misplaced item service, according to an embodiment.

FIG. 2 is a block diagram illustrating a misplaced item service 110 that is included in computing environment 101, according to an embodiment. In one embodiment, misplaced item service 110 includes client device interface module 202, bin grouping module 204 and list ordering module 206. This arrangement of modules and components may be a logical separation, and in other embodiments, these modules or other components can be combined together or separated in further components, according to a particular embodiment. In one embodiment, data store 120 is connected to misplaced item service 110 and includes bin inventory data 222, bin group data 224 and ordered list data 226. In one embodiment computing environment 101 may include both misplaced item service 110 and data store 120. In another embodiment, data store 120 may be external to computing environment 101 and may be connected to computing environment 101 over a network or other connection. In other embodiments, misplaced item service 110 may include different and/or additional components which are not shown to simplify the description. Data store 120 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, client device interface module 202 is responsible for communication and interaction with locator tool 134 on client device 130. In one embodiment, client device interface module 202 receives information sent from locator tool 134, such as information obtained using scanner 132. For example, client device interface module 202 may receive an indication of a location of a misplaced item bin or item storage bin within the materials handling facility. A materials handling facility associate may scan a barcode or other indicator on the bin using scanner 132 and locator tool 134 may provide an indication of the bin to client device interface module 202. In one embodiment, the received information may also include an indication of the location of the bin (which may be stored in the scanned barcode) or misplaced item service 110 may consult bin inventory data 222 in data store 120 to look up the location of the bin. In another embodiment, client device interface module 202 may receive an indication of the misplaced item from client device 130. For example, the materials handling facility associate may scan a barcode or other indicator on the misplaced item itself using scanner 132 and locator tool 134 may provide an indication of the misplaced item to client device interface module 202. In another embodiment, client device interface module 202 may provide an ordered list of potential item storage bins to locator tool 134. The materials handling facility associate may inspect the bins in the order they are listed in order to locate the bin where the misplaced item belongs. In another embodiment, client device interface module 202 may provide an indication of one potential item storage bin at a time to locator tool 134. Client device interface module 202 may receive a result of the inspection of that bin, and if the inspected bin was not the correct bin, may provide a next potential item storage bin to locator tool 134 for inspection.

In one embodiment, bin grouping module 204 identifies a group of potential item storage bins that may include the bin to which the misplaced item belongs. In one embodiment, bin grouping module 204 identifies all of the bins that are supposed to contain items of the same item type as the misplaced item. For example, bin grouping module 204 may consult bin inventory data 222 to identify the bins. Bin inventory data 222 may include an entry for each bin or other inventory storage location in the materials handling facility and may include an indication of what item types and how many of each item are supposed to be stored in the bin. Alternatively, bin inventory data 222 may be indexed by item type, with an entry for each item, and an indication of in which bins items of that type are supposed to be stored. In addition, bin grouping module 204 may group the potential bins by their respective distance from the misplaced item bin. In one embodiment, bin grouping module 204 may identify the location of each potential bin as well as the location of the misplaced item bin. The location of each bin may be stored in the corresponding entry in bin inventory data 222. Bin grouping module 204 may calculate the distance between each potential item storage bin and the misplaced item bin. This distance may be expressed in terms of standard units, such as feet or meters, or as a relative value expressed in terms of the locations in the materials handling facility, such as in a number of aisles, a number of bins, a number of floors, or using some other unit of measurement. Bin grouping module 204 may group the bins based on their distances from the misplaced item bin. In one embodiment, a number of thresholds or group boundaries may be established for the groups. For example, the group boundaries may be less than three aisles, three to six aisles, and six or more aisles. Bin grouping module 204 may place each potential item storage bin in a group according to these boundaries. In other embodiments, there may be some other number of bin groups and different or additional group boundaries may be used. Bin grouping module 204 may store the resulting bin groups as bin group data 224 in data store 120.

In one embodiment, list ordering module 206 determines an ordered list of potential item storage bins from a group of bins identified by bin grouping module 204. For example, list ordering module 206 may arrange the bins in a first group (e.g., within three aisles of the misplaced item bin in the materials handling facility) in an order to optimize a transit time between the potential items storage bins for the materials handling facility associate in order to improve the efficiency with which the proper item storage bin is determined. In one embodiment, list ordering module 206 assigns a weighting value to each of the potential item storage bins in the group and orders the bins from the highest weight to the lowest. In an alternative embodiment where a lower weight is indicative of higher preference, the bins may be ordered from the lowest weight to the highest. The weighting value may be determined for each potential item storage bin according to a number of factors. In one embodiment, the weighting value may be determined based at least in part on a bin location density of the potential item storage bin, a bin population density of the potential item storage bin and a last potential item storage bin inspected by the materials handling facility associate. These factors may be combined to determine the weighting value of each bin. In one embodiment, the weighting values represent the likelihood that the misplaced item belongs to a corresponding potential item storage bin. List ordering module 206 may store the resulting list as ordered list data 226. In one embodiment, the ordered list data 226 is statically created. For example, list ordering module 206 creates the ordered list 226 and the ordered list 226 does not change based on the result of any bin inspections by the materials handling facility associate. The materials handling facility associate may inspect each bin on the ordered list 226, in the original order 226, until the correct bin is located. In another embodiment, the ordered list data 226 is dynamically updated. Based on the result of each bin inspection by the materials handling facility associate, list ordering module 206 may recalculate the ordered list 226 using the results of the bin inspection, the location of the last bin inspected, and other factors. In this manner, the ordered list 226 may change over time from the originally determined order.

Figure 3:
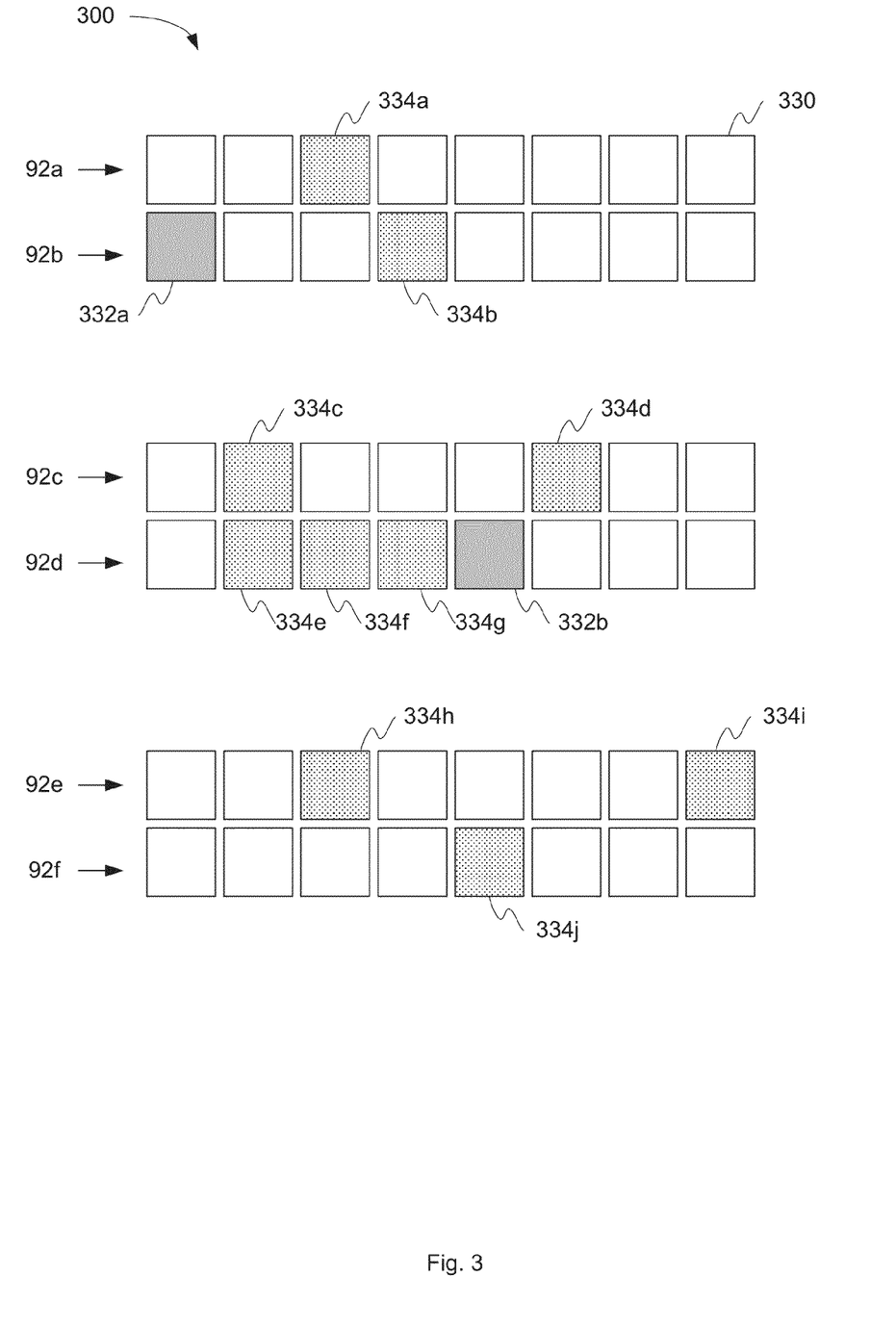
FIG. 3 is a block diagram illustrating an example representation of a materials handling facility, according to an embodiment.

FIG. 3 is a block diagram illustrating an example representation of a materials handling facility 300, according to an embodiment. The materials handling facility 300 may include, for example, a warehouse, storage unit, fulfillment center, or other facility and represents any appropriate facility for storing, distributing, and/or selling inventory items. Materials handling facility 300 may receive shipping containers of inventory items at various times, store the inventory items for a period of time and ship the inventory items out in response to receiving orders for the items.

Materials handling facility 300 may include various inventory holders 330 arranged according to a particular layout. As illustrated, the layout of inventory holders 330 of materials handling facility 300 is arranged in aisles 92a to 92f. Each aisle 92 of inventory holders 330 may hold various types of inventory items. Aisles 92 may be divided into sections, with each section holding one or more particular subtypes of inventory items. For example, materials handling facility may store various goods for consumer purchase on shelves arranged into aisles 92. Goods may be arranged by type and various subtypes in a manner typical to such facilities. It should be noted that while materials handling facility 300 is illustrated as including aisles 92 having sections of a particular layout and geometry, it is contemplated that materials handling facility 300 may have any appropriate layout and geometry. Moreover, while a specific illustration has been provided by way of example, the concepts of the present disclosure may apply to any number and/or types of facilities storing various types and categories of inventory items. Accordingly, while facility 300 is illustrated as arranging inventory items into aisles 92, facility 300 may be arranged in any appropriate layout having any appropriate arrangements and/or geometries of inventory items within inventory holders 330. Inventory holders 330 can represent any appropriate form of container into or onto which inventory items can be placed for storage, shipping, or other appropriate purposes. Examples of inventory holders 330 include, but are not limited to, shelves, boxes, pallets, bins, totes, cartons, etc. In another embodiment, inventory holders 330 can represent an inventory storage location within materials handling facility 300, such as a location on a shelf on an aisle. For ease of discussion, in the following description, inventory holders 330 are referred to as item storage bins 330.

Materials handling facility 300 may include one or more designated misplaced item bins 332a-332b. These misplaced item bins 332 may be bins or inventory storage locations that are not generally used to store inventory items, but rather are used to temporarily store misplaced items before those items can be returned to their proper item storage bins, e.g., 334a-334j. For example, if an item falls off a shelf, is dropped during transport, or is otherwise misplaced, the proper storage bin 330 may not be readily apparent. As a result, the misplaced item may be placed in the misplaced item bin 332 for processing. A materials handling facility associate may retrieve the misplaced item from one of misplaced item bins 332a-332b and inspect item storage bins 334a-334j according to an ordered list provided by misplaced item service 110 in order to find the proper storage bin. In different embodiments, misplaced item bins 332 may be located at different locations throughout materials handling facility 300. For example, a misplaced item bin 332 may be located on each aisle 92 or there may only be one misplaced item bin 332 per several aisles. On aisles that have a misplaced item bin 332, the misplaced item bins 332 may each be located in the same location (e.g., on the end of the aisle) or the misplaced item bins 332 maybe located at different locations on each aisle. Additional details of materials handling facility 300 are provided below.

Figure 4:
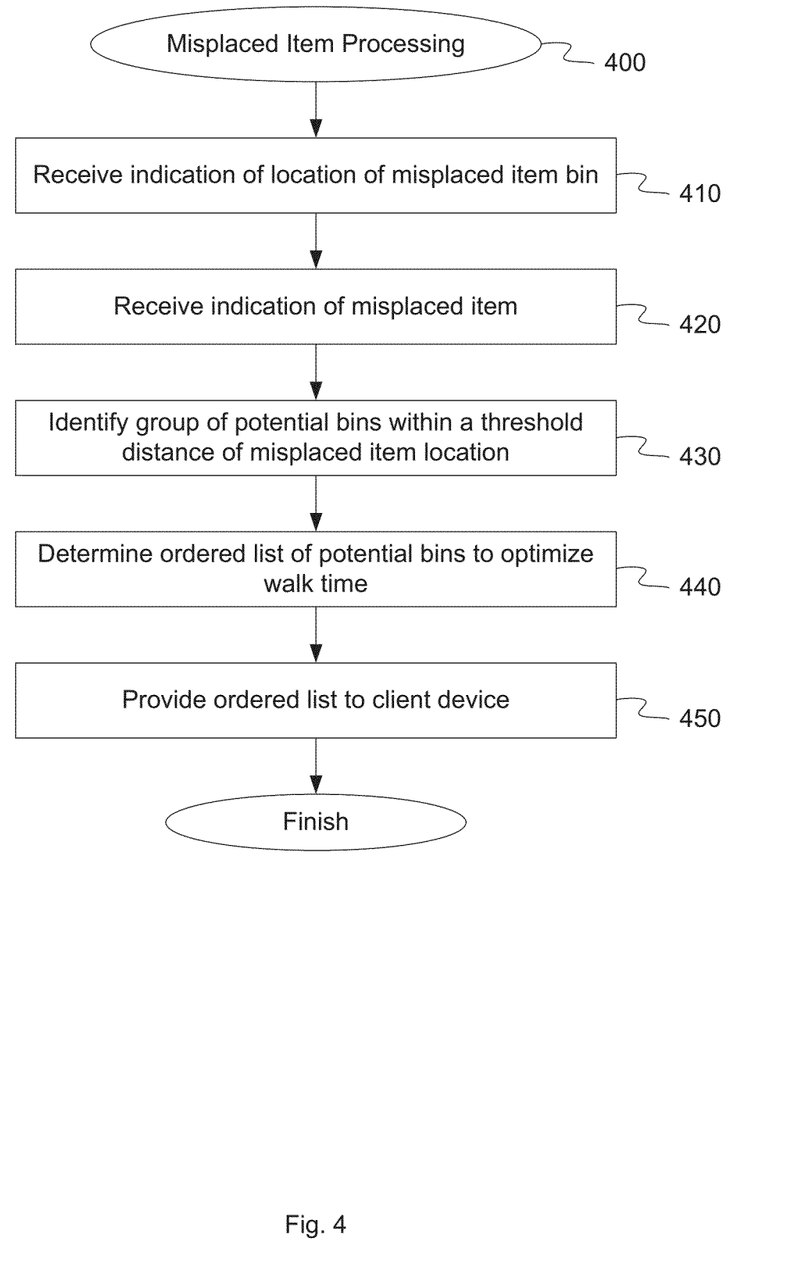
FIG. 4 is a flow diagram illustrating a method for misplaced item processing, according to an embodiment.

FIG. 4 is a flow diagram illustrating a method for misplaced item processing, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to generate an ordered list of potential item storage bins for a misplaced item in order to optimize a transit time between the potential item storage bins for a materials handling facility associate. In one embodiment, method 400 may be performed by misplaced item service 110, as shown in FIGS. 1 and 2.

Referring to FIG. 4, at block 410, method 400 receives an indication of a location of a misplaced item bin within a materials handling facility. In one embodiment, client device interface module 202 may receive an indication of a location of a misplaced item bin 332b within the materials handling facility 300. A materials handling facility associate may scan a barcode or other indicator on the bin using scanner 132 and locator tool 134 may provide an indication of the bin to client device interface module 202. In one embodiment, the received information may also include an indication of the location of the bin (which may be stored in the scanned barcode) or misplaced item service 110 may consult bin inventory data 222 in data store 120 to look up the location of the bin. In one embodiment, the misplaced item bin may not have a defined location within the materials handling facility (e.g., may be a movable bin) or may not have a barcode or other indicator that is able to be scanned. In this case, the associate may scan the nearest item storage bin to where the misplaced item bin is currently located and use the location of that item storage bin as the effective location of the misplaced item bin.

At block 420, method 400 receives an indication of a misplaced item. In one embodiment, the misplaced item may have been inadvertently removed from one of the plurality of item storage bins in the materials handling facility and placed into the misplaced item bin. In one embodiment, client device interface module 202 may receive an indication of the misplaced item from client device 130. For example, the materials handling facility associate may scan a barcode or other indicator on the misplaced item itself using scanner 132 and locator tool 134 may provide an indication of the misplaced item to client device interface module 202.

At block 430, method 400 identifies a group of potential item storage bins within a threshold distance of the location of the misplaced item bin. In one embodiment, a virtual inventory of the materials handling facility indicates that each potential item storage bin comprises one or more items having a same item type as the misplaced item. In one embodiment, bin grouping module 204 identifies a group of potential item storage bins 334a-334j that may include the bin to which the misplaced item belongs. In one embodiment, bin grouping module 204 identifies all of the bins that are supposed to contain items of the same item type as the misplaced item. For example, bin grouping module 204 may consult bin inventory data 222 to identify the bins. In one embodiment, bin grouping module 204 may identify the location of each potential bin 334a-334j as well as the location of the misplaced item bin 332b. Bin grouping module 204 may calculate the distance between each potential item storage bin and the misplaced item bin. Bin grouping module 204 may group the bins based on their distances from the misplaced item bin and store the resulting bin groups as bin group data 224 in data store 120. Additional details of bin grouping are described below with respect to FIG. 6.

At block 440, method 400 determines an ordered list of potential item storage bins from the group of potential item storage bins. In one embodiment, the potential item storage bins on the list are arranged in an order to optimize a transit time between the potential item storage bins for a materials handling facility associate. In one embodiment, list ordering module 206 determines an ordered list of potential item storage bins from a group of bins identified by bin grouping module 204. For example, list ordering module 206 may arrange the bins in a first group (e.g., within three aisles of the misplaced item bin in the materials handling facility) in an order to optimize a transit time between the potential item storage bins for the materials handling facility associate in order to improve the efficiency with which the proper item storage bin is determined. In one embodiment, list ordering module 206 assigns a weighting value to each of the potential item storage bins in the group and orders the bins from the highest weight to the lowest. In one embodiment, the weighting value may be determined based at least in part on a bin location density of the potential item storage bin, a bin population density of the potential item storage bin and a last potential item storage bin inspected by the materials handling facility associate. List ordering module 206 may store the resulting list as ordered list data 226. Additional details of list ordering are described below with respect to FIG. 7.

At block 450, method 400 provides the ordered list to a client device corresponding to the materials handling facility associate. In one embodiment, client device interface module 202 may provide an ordered list of potential item storage bins to locator tool 134. The materials handling facility associate may inspect the bins in the order they are listed in order to locate the bin where the misplaced item belongs.

Figure 5:
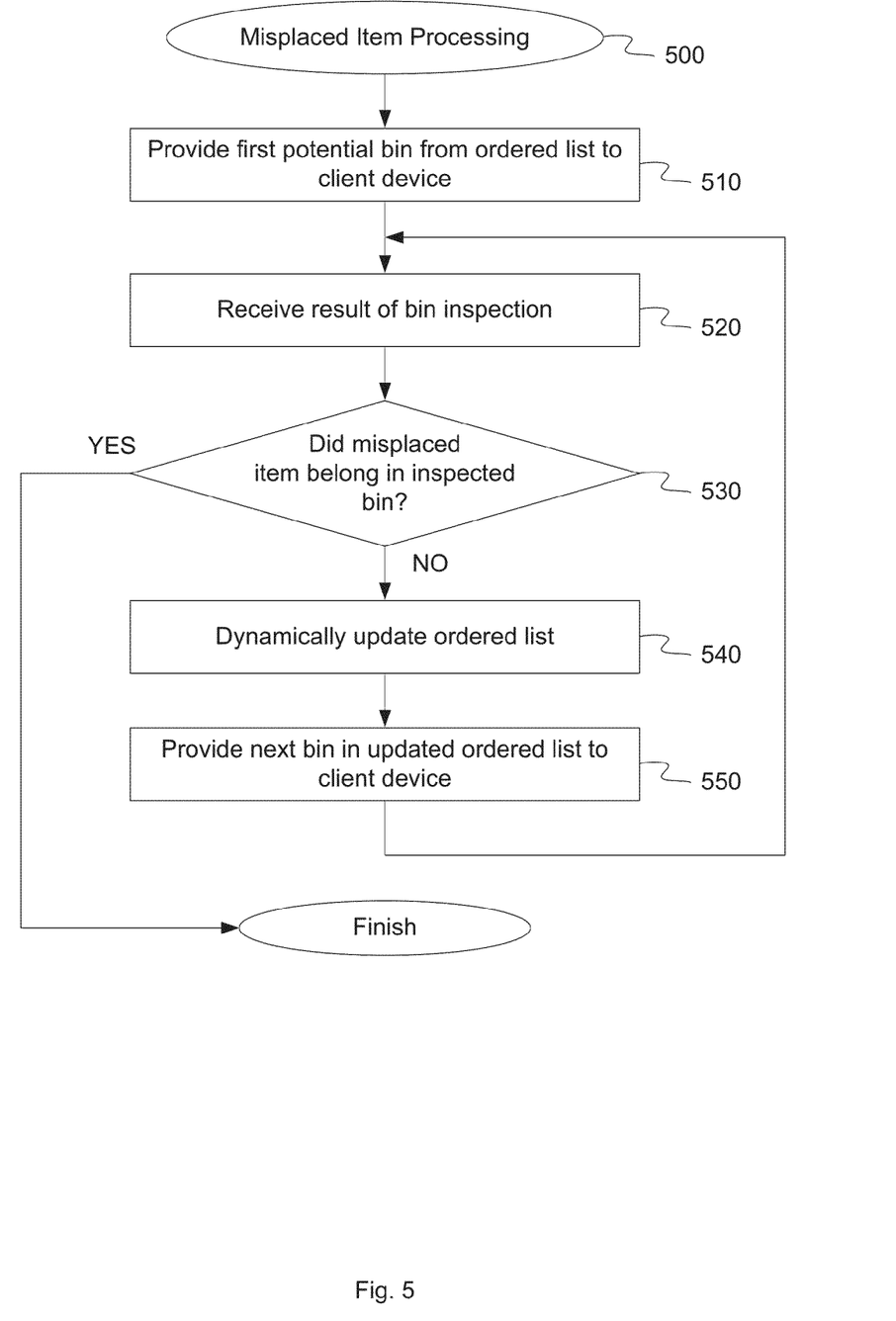
FIG. 5 is a flow diagram illustrating a method for misplaced item processing, according to an embodiment.

FIG. 5 is a flow diagram illustrating a method for misplaced item processing, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to generate an ordered list of potential item storage bins for a misplaced item in order to optimize a transit time between the potential item storage bins for a materials handling facility associate. In one embodiment, method 500 may be performed by misplaced item service 110, as shown in FIGS. 1 and 2.

Referring to FIG. 5, at block 510, method 500 provides an indication of a first potential item storage bin from the ordered list to the client device. In one embodiment, the first potential item storage bin may be the bin with the highest weighting value. In other embodiments, the first potential item storage bin may be some other bin on the ordered list.

At block 520, method 500 receives a result of an inspection of the first potential item storage bin by the materials handling facility associate. In one embodiment, the inspection comprises comparing an actual number of items having the same item type as the misplaced item that are present in the potential item storage bin to a number of items indicated in the virtual inventory for the potential item storage bin.

At block 530, method 500 determines whether the misplaced item belonged in the inspected bin. In one embodiment, the misplaced item belongs in the bin if the physical inventory of the bin mismatches the virtual inventory bin by one item of the same type of the misplaced item. For example, if the misplaced item is a widget, and the virtual inventory for the potential item storage bin indicates that there should be ten widgets in the bin, but the inspection by the associate reveals that there are actually only nine widgets in the bin, the misplaced widget belongs to that bin. If the physical inventory of the bin matches the virtual inventory of the bin, then the misplaced item does not belong to that bin.

At block 540, method 500 dynamically updates the ordered list of potential item storage bins. Based on the result of the bin inspection (i.e., whether or not the misplaced item belonged to the first potential item storage bin), list ordering module 206 can dynamically update the list. In one embodiment, dynamically updating the ordered list includes recalculating the weighting values for each of the potential item storage bins. During the recalculation, one or more of the factors may be reconsidered, such as the bin location density of the potential item storage bin, the bin population density of the potential item storage bin and the last potential item storage bin inspected by the materials handling facility associate.

At block 550, method 500 provides an indication of the next potential item storage bin from the updated list to the client device. In one embodiment, the next potential item storage bin may be the bin with the highest weighting value. In other embodiments, the next potential item storage bin may be some other bin on the ordered list.

Figure 6:
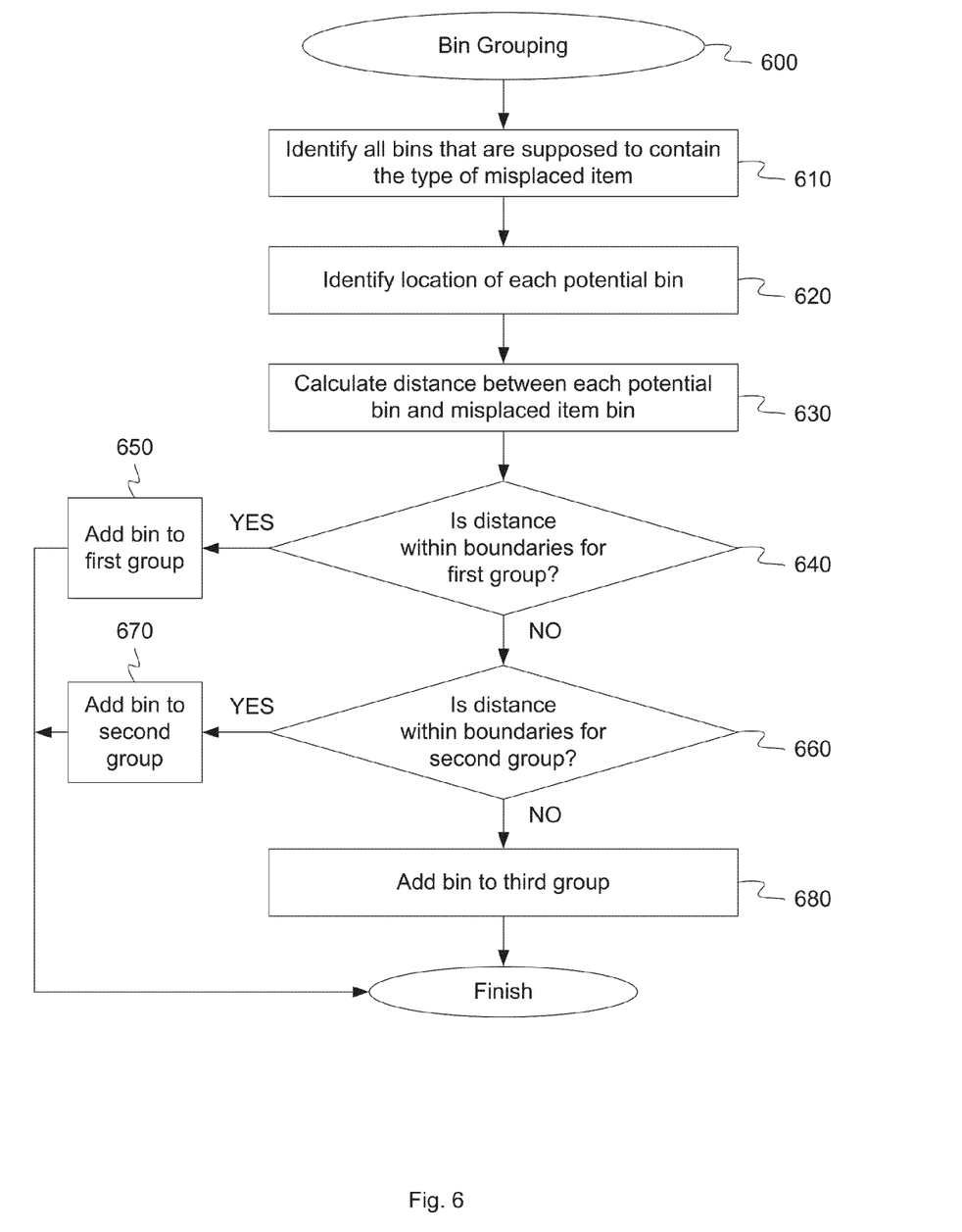
FIG. 6 is a flow diagram illustrating a method for bin grouping, according to an embodiment.

FIG. 6 is a flow diagram illustrating a method for bin grouping, according to an embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to identify a group of potential item storage bins for a misplaced item, where each potential item storage bin in the group is within a threshold distance from the location of the misplaced item bin. In one embodiment, method 600 may be performed by misplaced item service 110, as shown in FIGS. 1 and 2.

Referring to FIG. 6, at block 610, method 600 identifies a plurality of item storage bins that are supposed to contain the type of misplaced item. In one embodiment, bin inventory data 222 indicates the presence of one or more items having a same item type as the misplaced item in the potential item storage bins 334a-334j. In one embodiment, bin grouping module 204 may consult bin inventory data 222 to identify the bins. Bin inventory data 222 may include an entry for each bin or other inventory storage location in the materials handling facility and may include an indication of what item types and how many of each item are supposed to be stored in the bin. Alternatively, bin inventory data 222 may be indexed by item type, with an entry for each item, and an indication of in which bins items of that type are supposed to be stored.

At block 620, method 600 identifies a location of each potential item storage bin. In one embodiment, bin grouping module 204 may identify the location of each potential bin as well as the location of the misplaced item bin. The location of each bin may be stored in the corresponding entry in bin inventory data 222.

At block 630, method 600 calculates a distance between each potential item storage bin and the misplaced item bin. Bin grouping module 204 may calculate the distance between each potential item storage bin 334a-334j and the misplaced item bin 332b. This distance may be expressed in terms of standard units, such as feet or meters, or as a relative value expressed in terms of the locations in the materials handling facility, such as in a number of aisles, a number of bins, a number of floors, or using some other unit of measurement.

At block 640, method 600 determines whether the distance for a given item storage bin is within the boundaries for a first group. In one embodiment, a number of thresholds or group boundaries may be established for the groups. For example, the group boundaries may be less than three aisles, three to six aisles, and six or more aisles. Bin grouping module 204 may place each potential item storage bin in a group according to these boundaries. If the distance is within the boundaries for the first group, at block 650, method 600 adds the item storage bin to the first group by storing an indication of the bin in bin group data 224. If the distance is not within the boundaries for the first group, at block 660, method 600 determines whether the distance for a given item storage bin is within the boundaries for a second group (e.g., three to six aisles). If the distance is within the boundaries for the second group, at block 670, method 600 adds the item storage bin to the second group. If the distance is not within the boundaries for the second group, at block 680, method 600 adds the item storage bin to a third group. In other embodiments, there may be some other number of bin groups and different or additional group boundaries may be used.

Figure 7:
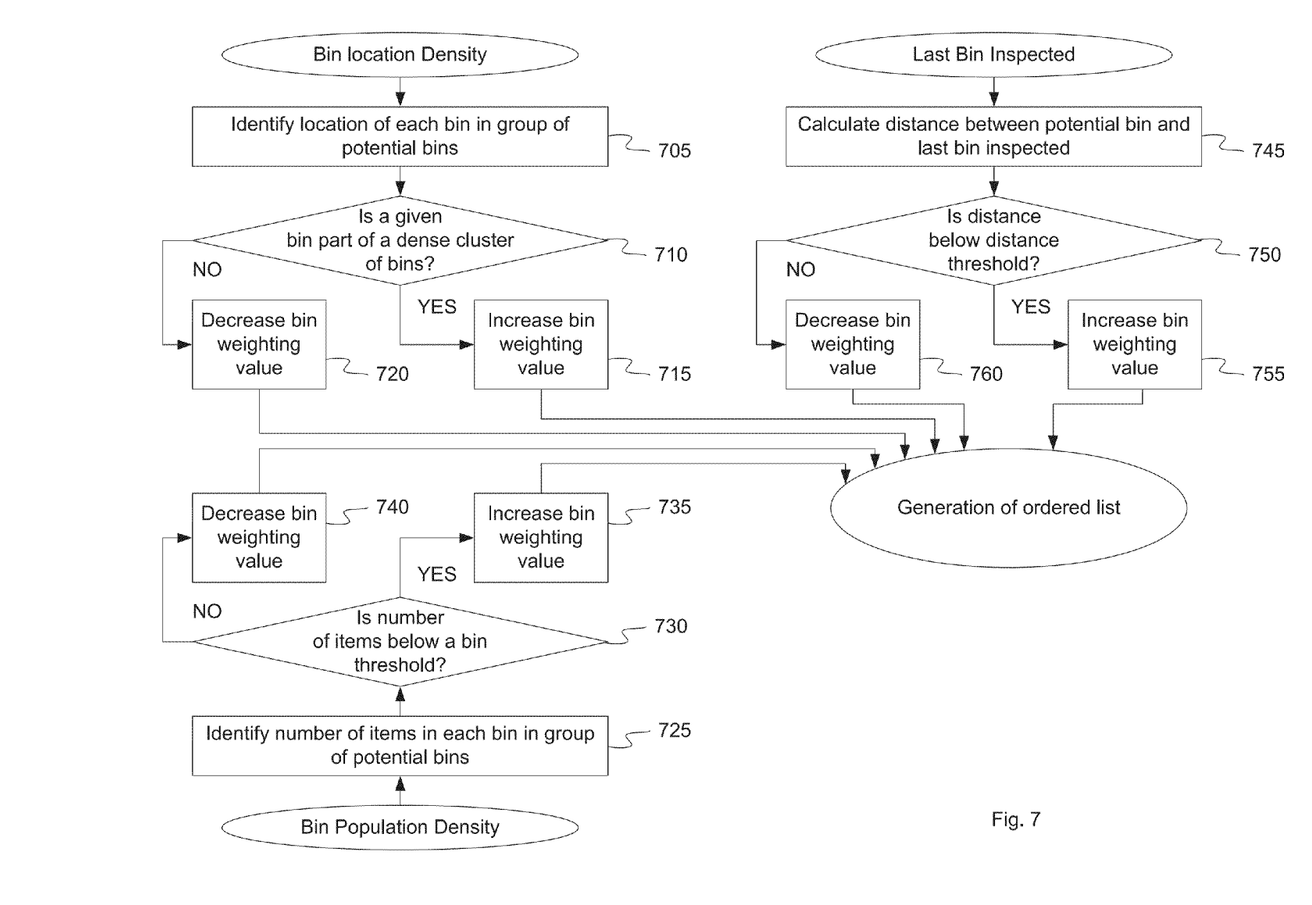
FIG. 7 is a flow diagram illustrating a method for ordered list generation, according to an embodiment.

FIG. 7 is a flow diagram illustrating a method for ordered list generation, according to an embodiment. The method 700 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to generate an ordered list of potential item storage bins for a misplaced item in order to optimize a transit time between the potential item storage bins for a materials handling facility associate. In one embodiment, method 700 may be performed by misplaced item service 110, as shown in FIGS. 1 and 2.

Referring to FIG. 7, at block 705, method 700 identifies a location of each bin in a group of potential item storage bins. In one embodiment, list ordering module 206 may identify the location of each potential bin. The location of each bin may be stored in the corresponding entry in bin inventory data 222.

At block 710, method 700 determines whether a given bin is part of a dense cluster of bins. In one embodiment, list ordering module 206 may use a defined cluster radius and cluster threshold to determine whether the bin is part of a cluster. The cluster radius may represent a distance (e.g., one aisle, ½ an aisle) and the cluster threshold may represent a number of other potential item storage bins within the cluster radius distance from the given bin. Referring to FIG. 3 for example, if the cluster radius is one aisle and the cluster threshold is three bins, potential item storage bins 334e, 334f and 334g would meet the criteria for a cluster on aisle 92d. There are no other bins in materials handling facility 300 that have at least three potential item storage bins 334 within the same aisle 92.

If the given bin is part of a dense cluster of bins, at block 715, method 700 increases the bin weighting value for the bin. In one embodiment, list ordering module 206 may increase the weighting value by a fixed amount (e.g., one unit) for each of the bins in the cluster 334e-334g. In another embodiment, list ordering module 206 may increase the weighting value by a variable amount depending on the density of the cluster. For example, since there are three bins in the cluster, the weighting value for each bin may be increased by three units. If there were four bins in the cluster, the weighting value may be increased by four units and so on. In other embodiments, the weighting value may be adjusted by some other amount. By increasing the weighting value of bins in a dense cluster, list ordering module 206 increases the priority of those bins in the ordered list. This may be advantageous because when multiple bins are located physically close to one another, it is quick and easy for a materials handling facility associate to inspect each of those bins in succession. This can increase the efficiency of finding the proper item storage bin for the misplaced item. If the given bin is not part of a dense cluster of bins, at block 720, method 700 decreases the bin weighting value for the bin. In another embodiment, method 700 may keep the bin weighting value constant rather than decreasing the value.

At block 725, method 700 identifies the number of items in each item storage bin in the group of potential item storage bins. In one embodiment, list ordering module 206 consults bin inventory data 222 to determine the number of items that are supposed to be stored in each bin according to the virtual inventory.

At block 730, method 700 determines whether the number of items in a given bin is below a bin threshold. In one embodiment, list ordering module 206 may compare the number of items in the bin to the threshold. The threshold may be a configurable value that is the same for every bin regardless of the type of items stored therein or that is specific to each individual bin and is set with respect to the type of items stored therein.

If the number of items in the given bin is below or equal to the bin threshold, at block 735, method 700 increases the bin weighting value for the bin. In one embodiment, list ordering module 206 may increase the weighting value by a fixed amount (e.g., one unit) for each of the bins that fall below the bin threshold. In another embodiment, list ordering module 206 may increase the weighting value by a variable amount depending on the density of the bin. For example, the more that the number of items in the bin is below the threshold, the higher the bin weighting value may be. In other embodiments, the weighting value may be adjusted by some other amount. By increasing the weighting value of bins that are less densely packed, list ordering module 206 increases the priority of those bins in the ordered list. This may be advantageous because when bins are less densely packed (i.e., there are fewer items stored in the bin), it is quick and easy for a materials handling facility associate to inspect each of those bins. This can increase the efficiency of finding the proper item storage bin for the misplaced item. If the number of items in the given bin is above the bin threshold, at block 740, method 700 decreases the bin weighting value for the bin. In another embodiment, method 700 may keep the bin weighting value constant rather than decreasing the value.

At block 745, method 700 calculates the distance between a given potential bin and the last bin inspected by the materials handling facility associate. List ordering module 206 may calculate the distance between each potential item storage bin 334a-334j and the last bin inspected by the associate. This distance may be expressed in terms of standard units, such as feet or meters, or as a relative value expressed in terms of the locations in the materials handling facility, such as in a number of aisles, a number of bins, a number of floors, or using some other unit of measurement. An indication of the location of the last bin inspected may be received from client device 130 and stored by misplaced item service 110 in data store 120. In the event that no potential item storage bin has yet been inspected, list ordering module 206 may use the location of the misplaced item bin 332b.

At block 750, method 700 determines whether the distance determined at block 745 is below a distance threshold. In one embodiment, list ordering module 206 may compare the distance to the threshold. The threshold may be a configurable value that is the same for every bin or that is specific to each individual bin.

If the distance between the given potential bin and the last bin inspected is below or equal to the distance threshold, at block 755, method 700 increases the bin weighting value for the bin. In one embodiment, list ordering module 206 may increase the weighting value by a fixed amount (e.g., one unit) for each of the bins that fall below the distance threshold. In another embodiment, list ordering module 206 may increase the weighting value by a variable amount depending on the actual distance from the last bin inspected. For example, the more that the distance is below the threshold, the higher the bin weighting value may be. In other embodiments, the weighting value may be adjusted by some other amount. By increasing the weighting value of bins that are located near the last bin inspected (which is presumably where the materials handling facility associate is still located), list ordering module 206 increases the priority of those bins in the ordered list. This may be advantageous because when the next bin to be inspected is located close to the last bin that was inspected, it is quick and easy for the materials handling facility associate to walk to the next bin. This can increase the efficiency of finding the proper item storage bin for the misplaced item. If the distance between the given potential bin and the last bin inspected is above the distance threshold, at block 760, method 700 decreases the bin weighting value for the bin. In another embodiment, method 700 may keep the bin weighting value constant rather than decreasing the value.

Figure 8:
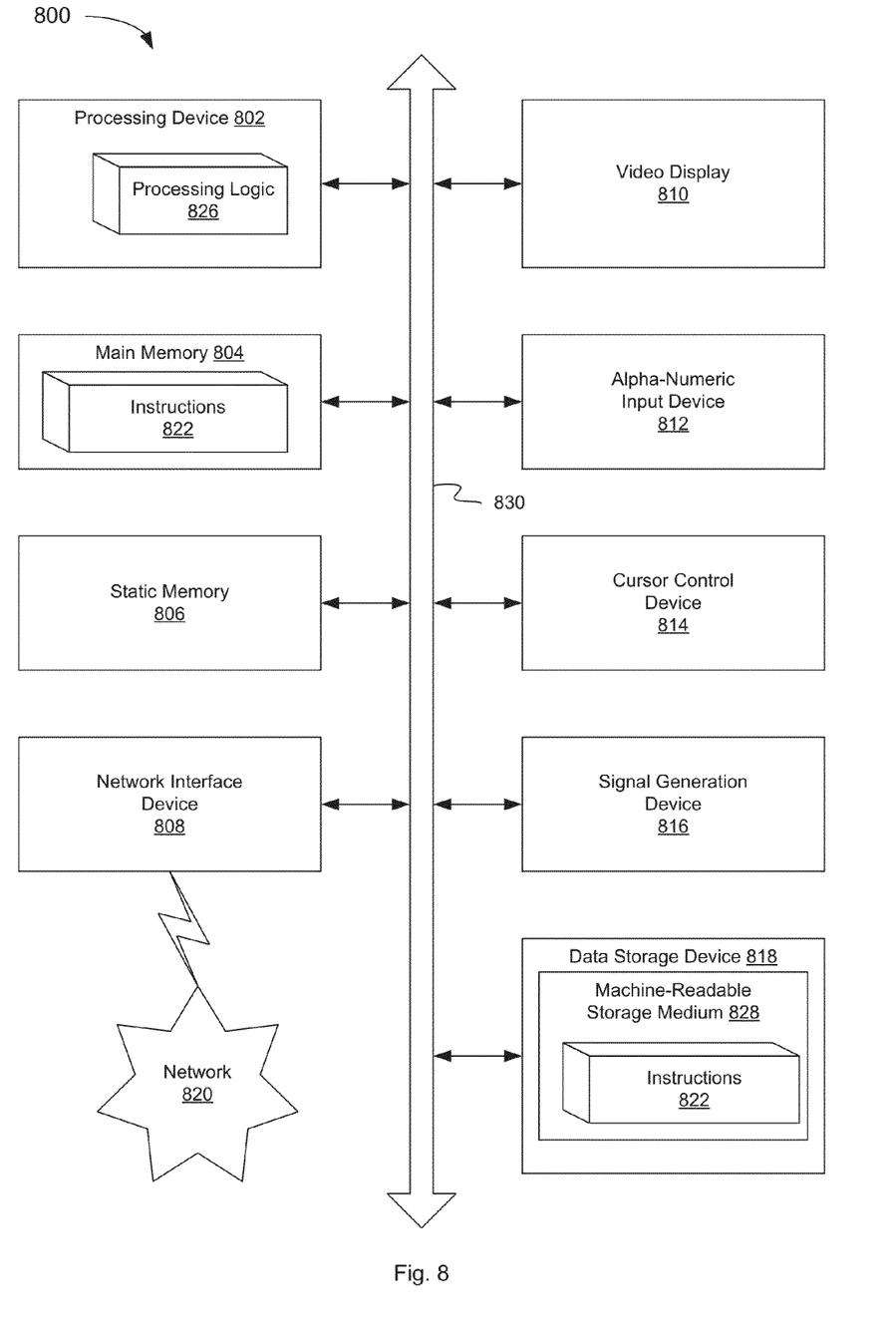
FIG. 8 is a block diagram illustrating an exemplary computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may represent computing environment 101 of FIG. 1.

The exemplary computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of misplaced item service 110) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

receiving, by a processing device, an indication of a location of a misplaced item bin within a materials handling facility, the materials handling facility comprising a plurality of bins, the plurality of bins comprising the misplaced item bin and a plurality of item storage bins;

receiving, by the processing device, an indication of a misplaced item, the misplaced item having been inadvertently removed from one of the plurality of item storage bins and placed in the misplaced item bin;

identifying, by the processing device, a group of potential item storage bins for storage of the misplaced item, wherein each potential item storage bin in the group is located within a threshold distance of the location of the misplaced item bin, wherein a virtual inventory of the materials handling facility indicates that each potential item storage bin in the group comprises one or more items having a same item type as the misplaced item;

determining, by the processing device, an ordered list of potential item storage bins from the group of potential bins, wherein the potential item storage bins on the ordered list are arranged in an order configured to optimize a transit time between the potential item storage bins in the materials handling facility for a materials handling facility associate to store the misplaced item; and providing, by the processing device, the ordered list to a client device corresponding to the materials handling facility associate.

2. The method of claim 1, further comprising:

receiving a result of an inspection of one of the potential item storage bins on the ordered list by the materials handling facility associate, wherein the inspection comprises comparing an actual number of items having the same item type as the misplaced item that are present in the potential item storage bin to a number of items indicated in the virtual inventory for the potential item storage bin; and if the actual number of items does not match the number of items indicated in the virtual inventory, dynamically updating the ordered list of potential item storage bins and providing the updated ordered list to the client device.

3. The method of claim 1, further comprising:

assigning a bin weighting value to each of the potential item storage bins based at least in part on at least one of a bin location density of the potential item storage bin, a bin population density of the potential item storage bin and a last potential item storage bin inspected by the materials handling facility associate.

4. The method of claim 3, wherein determining the ordered list comprises ranking the potential item storage bins based at least in part on the respective bin weighting values.

5. A system comprising:

a memory configured to store a misplaced item service; and a processing device operatively coupled to the memory, the processing device to execute the misplaced item service configured to:

identify a plurality of inventory storage locations in a materials handling facility for storage of a misplaced item; and determine an ordered list of the plurality of inventory storage locations, wherein the inventory storage locations are arranged in the ordered list based at least in part on at least one of a location density of the inventory storage locations, a population density of the inventory storage locations and a last inventory storage location inspected.

6. The system of claim 5, wherein the misplaced item service is further configured to:

receive an indication of a misplaced item storage location within the materials handling facility; and receive an indication of the misplaced item, the misplaced item having been inadvertently removed from one of the plurality of inventory storage locations in the materials handling facility and placed in the misplaced item storage location.

7. The system of claim 6, wherein to identify the plurality of inventory storage locations, the misplaced item service is further configured to:

identify a plurality of inventory storage locations for which a virtual inventory of the materials handling facility indicates a presence of one or more items having a same item type as the misplaced item;

determine a distance between the misplaced item storage location and each of the plurality of inventory storage locations; and compare the distance between the misplaced item storage location and each of the plurality of inventory storage locations to a first threshold distance.

8. The system of claim 5, wherein the location density of the inventory storage locations comprises a number of other inventory storage locations located in proximity to each of the inventory storage locations.

9. The system of claim 5, wherein the population density of the inventory storage locations comprises a number of items having a same item type as the misplaced item that are present in each of the inventory storage locations.

10. The system of claim 5, wherein a last inventory storage location inspected comprises one of the plurality of inventory storage locations inspected most recently by a materials handling facility associate prior to the ordered list being determined.

11. The system of claim 5, wherein to determine the ordered list of the plurality of inventory storage locations, the misplaced item service is further configured to:

assign a weighting value to each of the plurality of inventory storage locations based at least in part on at least one of the location density of the inventory storage locations, the population density of the inventory storage locations and the last inventory storage location inspected; and rank the plurality of inventory storage locations in the ordered list based at least in part on the respective weighting values.

12. The system of claim 5, wherein the misplaced item service is further configured to:

receive a result of an inspection of one of the plurality of inventory storage locations on the ordered list by a materials handling facility associate, wherein the inspection comprises comparing an actual number of items having a same item type as the misplaced item that are present in the inventory storage location to a number of items indicated in a virtual inventory for the inventory storage location; and if the actual number of items does not match the number of items indicated in the virtual inventory, dynamically updating the ordered list of inventory storage locations and providing the updated ordered list to a client device.

13. A non-transitory computer-readable storage medium storing instructions which, when executed, cause a processing device to perform operations comprising:

receiving, by the processing device, an indication of a location of a misplaced item bin within a materials handling facility;

receiving, by the processing device, an indication of a misplaced item;

identifying, by the processing device, a group of potential item storage bins for storage of the misplaced item, wherein each potential item storage bin in the group is located within a threshold distance of the location of the misplaced item bin;

determining, by the processing device, an ordered list of potential item storage bins from the group of potential bins, wherein the potential item storage bins on the ordered list are arranged at least in part according to weighting values representing a likelihood that the misplaced item belongs to the potential item storage bins; and providing, by the processing device, the ordered list to a client device corresponding to a materials handling facility associate.

14. The non-transitory computer-readable storage medium of claim 13, wherein the materials handling facility comprises a plurality of bins, the plurality of bins comprising the misplaced item bin and a plurality of item storage bins.

15. The non-transitory computer-readable storage medium of claim 14, wherein the misplaced item has been inadvertently removed from one of the plurality of item storage bins and placed in the misplaced item bin.

16. The non-transitory computer-readable storage medium of claim 13, wherein a virtual inventory of the materials handling facility indicates that each potential item storage bin in the group comprises one or more items having a same item type as the misplaced item.

17. The non-transitory computer-readable storage medium of claim 13, wherein the potential item storage bins on the ordered list are arranged in an order configured to optimize a transit time between the potential item storage bins in the materials handling facility for the materials handling facility associate.

18. The non-transitory computer-readable storage medium of claim 13, wherein the operations further comprise:

assigning a bin weighting value to each of the potential item storage bins based at least in part on at least one of a bin location density of the potential item storage bin, a bin population density of the potential item storage bin and a last potential item storage bin inspected by the materials handling facility associate; and ranking the potential item storage bins in the ordered list based at least in part on the respective bin weighting values.

19. The non-transitory computer-readable storage medium of claim 18, wherein the bin location density of the potential item storage bin comprises a number of other potential item storage bins located in proximity to each of the potential item storage bins, and wherein the bin population density of the potential item storage bin comprises a number of items having a same item type as the misplaced item that are present in each of the potential inventory storage bins.

20. The non-transitory computer-readable storage medium of claim 18, wherein the last potential item storage bin inspected by the materials handling facility associate comprises one of the plurality of potential item storage bins inspected most recently by the materials handling facility associate prior to the ordered list being determined.

\* \* \* \* \*